Figure 1:
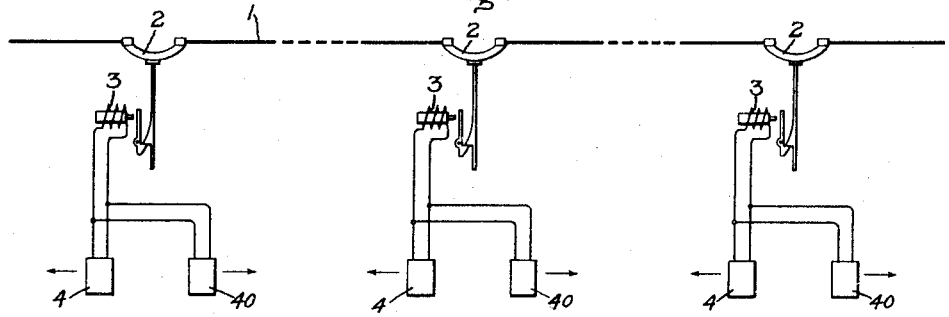

July 7, 1931.     F. J. LANE ET AL     1,813,749
PROTECTIVE ARRANGEMENT
Filed July 8, 1929

Inventors:
Francis J. Lane,
Robert D. Parry,
by Charles V. Tullar
Their Attorney.

Patented July 7, 1931

1,813,749

UNITED STATES PATENT OFFICE

FRANCIS JOHN LANE, OF HARLSDEN, LONDON, AND ROBERT D. PARRY, OF NORTHWAY, NEASDEN, ENGLAND, ASSIGNORS TO GENERAL ELECTRIC COMPANY, A CORPORATION OF NEW YORK

PROTECTIVE ARRANGEMENT

Application filed July 8, 1929, Serial No. 376,764, and in Great Britain July 11, 1928.

Our invention relates to protective arrangements for A. C. or D. C. electric systems so that a faulty section of the same, for example, a feeder, inter-connector or the like, or a portion thereof, or apparatus such as transformers or reactances, can be automatically disconnected from the rest of the system.

Protective apparatus depending for its action on the resistance (or impedance) of the section to be protected is well known, and includes the use of current and voltage coils, the effects of which are arranged to counterbalance one another when the section being protected is sound, the effect of the current coil predominating when a fault occurs and affecting directly or indirectly the operation of the circuit breaker which disconnects the faulty section from the rest of the system.

In accordance with our invention, a relay having electromagnetic elements energized in response to the voltage and current obtained directly from one end of the section to be protected is employed, the effect of the two elements on the operating member of the relay being in opposition, and that of the voltage element preponderating to bias the operating element to an inoperative position when the section is sound. The relay is so adjusted that the effect of the current and voltage elements on the operating member is just neutralized when the values of current and voltage are such that they correspond to a resistance or impedance equal to that of the section. If the resistance or reactance or impedance of the section is known, the voltage necessary to send a given current through that section can readily be determined and the relay is adjusted so that the effects of the current and voltage elements balance when they are energized by current and voltage in those proportions. If a fault occurs on the section, the effective impedance of the section is altered, thus disturbing the balance of the effects of the voltage and current elements and causing operation of the relay. On operation of the relay a contact is closed which causes the disconnection of the defective section.

Owing to the inverse time characteristic of a relay of this nature, faults at the remote end of the section being protected would remain for a long period before the operation of the relay effected the disconnection of the section. In fact, a fault which occurs exactly at the far end of the section would take an infinite time to actuate the circuit breaker. In accordance with a further feature of our invention, this difficulty is overcome by setting an impedance type protective relay so that the balance of current and voltage coils occurs over an impedance which is a definite percentage greater than the impedance of the section to be protected, for example, a 10% increase in feeder impedance may be taken. The additional 10% of the section will be overlapped in protection by the relay associated with the adjacent section. Owing to the fact that a fault occurring in the 10% overlap will occur in a portion of one adjacent section such that the increased effect of the current coil associated with that relay is very great, the relay protecting that section will operate substantially instantaneously, and consequently the fault will be cleared before the operation of the relay associated with the initial section under consideration.

The impedance relay is normally calibrated for a voltage and current balance corresponding to a definite feeder length or impedance. It will be realized that, under actual fault conditions, the total voltage drop for the feeder length protected may be only a small percentage, say 10%, of the total voltage available on the system. It is at this low voltage that full operating effort is required from the relay to give satisfactory operation. If, however, we design the relay to give sufficient effort under low voltage conditions, then immediately normal conditions are restored, the voltage element would take an excessive current and would probably burn out in a very short period. It is thus necessary, in normal conditions, to connect in series with the voltage element an impedance device such as a choke coil or limiting resistance so that the normal current taken by that element is kept within its heat dissipating capacity. An additional fault responsive device such as an instantaneous overcurrent relay is then provided so that immediately a fault occurs on the system, this relay is energized and closes its contacts to short-circuit the limiting choke or resistance. Thus, on the occurrence of a fault, the calibration of the impedance relay is instantaneously adjusted to its desired value and it will then function selectively.

Our invention will be better understood from the following description when considered in connection with the accompanying drawings and its scope will be pointed out in the appended claims.

Figure 2:
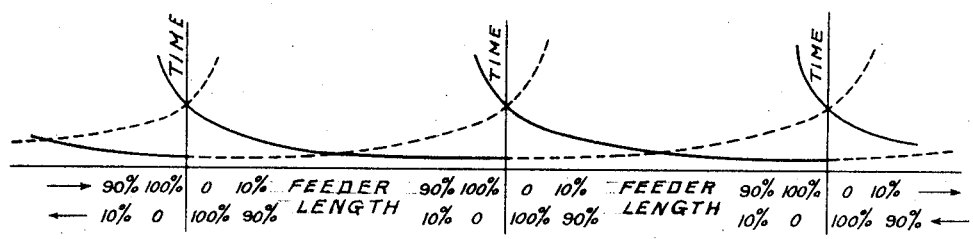

Fig. 1 illustrates diagrammatically a protective arrangement embodying our invention; Fig. 2 illustrates the operating characteristics of the relay apparatus shown in Fig. 1; and Fig. 3 illustrates diagrammatically the relay apparatus at one point of a system to be protected.

In Fig. 1 which shows diagrammatically the general arrangement, a feeder 1 is divided into a number of sections which are arranged to be disconnected from one another by means of circuit breakers 2 provided with trip coils 3. Each of the trip coils is operated in parallel through impedance type relays 4 and 40, which are set to operate in the manner which forms the subject of our invention. The two relays may be provided for operation in the direction shown by the accompanying arrows, and it is to be understood that suitable directional relays are provided for giving the impedance relays their directional characteristics. In the event of the feeder being supplied only from one end, then only a single impedance relay would be required for the operation of each circuit breaker.

Fig. 2 shows the operating characteristics of the relays 4 and 40, the time of operation being plotted as ordinates against feeder length as abscissæ. The curves shown in dotted lines refer to the relays 40 and those in full lines to the relays 4.

Figure 3:
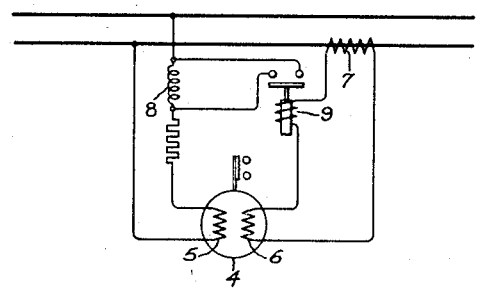

Fig. 3 shows the manner in which the relay 4 is connected as applied to a single phase feeder, voltage element 5 being connected to be responsive to the voltage across one end of the feeder and the current coil 6 being connected through a current transformer 7 to be responsive to the current flowing at that end of the feeder. The relays may be of the induction disk type, as shown, and are so adjusted that the effects of the voltage and current elements are just neutralized when the values of current and voltage in the section correspond with those for the impedance of the section. For example, if the feeder has an impedance of 10 ohms, a voltage of 500 volts will send a current of 50 amperes through the section. The voltage and current elements would therefore be set to balance at a voltage of 500 and a current of 50 amperes respectively. In the event of a fault occurring at the extreme end of a section remote from the relay, the relay would take an infinite time to operate. This is shown by the inverse time characteristic of the relay in Fig. 2.

In order to overcome this disadvantage we set the relays to balance at values corresponding to say, 110% of the feeder impedance. This gives the overlap indicated in Fig. 2. Consequently, for a fault occurring at the right-hand side of, and adjacent to one of the circuit breakers 2, at the end of a section, relays 40 and 4 at either end of the section would operate, opening the corresponding circuit breakers and disconnecting the faulty section. The circuit breakers at the ends of the sections adjacent to the faulty section would not be energized, however, as they would take a substantially infinite time to operate and the fault would have, by then, been cleared.

For a feeder supplied from only one end, the relay nearest the fault would operate in a very short period of time, while the relays nearer to the source of supply would not operate, as the fault would have been cleared before their time for operation had expired.

Referring again to Fig. 3, it will be realized that, under actual fault conditions, the total voltage drop for the feeder length protected may be only a small percentage of the total voltage available on the system. If, therefore, the relay is set to operate under low voltage conditions, then immediately normal conditions are restored, the voltage element would take an excessive current and would probably be burnt out within a short period of time. In normal conditions, therefore, we connect in series with the voltage element 5 of the relay a choke coil or limiting resistance 8 of such value as to keep the normal current taken by the coil within its heat-dissipating capacity. An additional instantaneous overcurrent relay 9 is provided which may be connected as shown in series with the current element 6 of the relay, the relay 9 being energized to close its contacts to short-circuit the choke coil 8 immediately a predetermined overcurrent occurs on the line, thus on the occurrence of a fault, the calibration of the impedance relay 4 is instantaneously adjusted to its desired value so that it will operate selectively.

What we claim as new and desire to secure by Letters Patent of the United States is:

1. In a protective arrangement for an electric circuit, a relay having opposing current and voltage elements connected to be energized from the circuit, said current element preponderating over said voltage element when the current and voltage at the relay location correspond to an impedance characteristic less than that of a section of the circuit, means for limiting the voltage applied to the voltage element of the relay when the section of the circuit with which the relay is associated is sound and means for eliminating the effect of the voltage limiting means on the occurrence of abnormal circuit conditions.

2. In a protective arrangement for an electric circuit, an impedance relay having cooperating current and voltage elements connected to be energized from the circuit, means for normally limiting the voltage applied to the voltage element of the relay, and means for eliminating the effect of the voltage limiting means under fault conditions.

3. In a protective arrangement for an electric circuit, a relay including a movable member and current and voltage means energized from the circuit for exerting opposing effects on said member, impedance means for normally limiting the voltage applied to the voltage means, and means responsive to an abnormal circuit condition for eliminating the effect of said impedance means.

4. In a protective arrangement for an electric circuit, a relay including a movable member and current and potential elements connected to be energized from the circuit for exerting on said member opposing forces, the effect of said current element being predominating when the current and voltage at the relay location correspond to an impedance characteristic less than that of a predetermined portion of the circuit, an impedance device normally connected in series with the voltage element of the relay and means responsive to abnormal circuit conditions for short-circuiting said impedance device.

5. In a protective arrangement for an electric circuit, an impedance relay including a movable member, and opposed current and voltage windings connected to be energized from the circuit for controlling said member, an impedance device connected in circuit with said voltage winding for normally limiting the voltage applied thereto and fault responsive relay means for reducing the effect of said impedance device on the occurrence of an abnormal circuit condition.

In witness whereof, we have hereunto set our hands this 24th day of June, 1929.

FRANCIS JOHN LANE.
ROBERT D. PARRY.